May 23, 1967  W. G. ANDERS  3,321,260
MECHANIZED POWER FILE CONSTRUCTION
Filed May 31, 1966  5 Sheets-Sheet 1
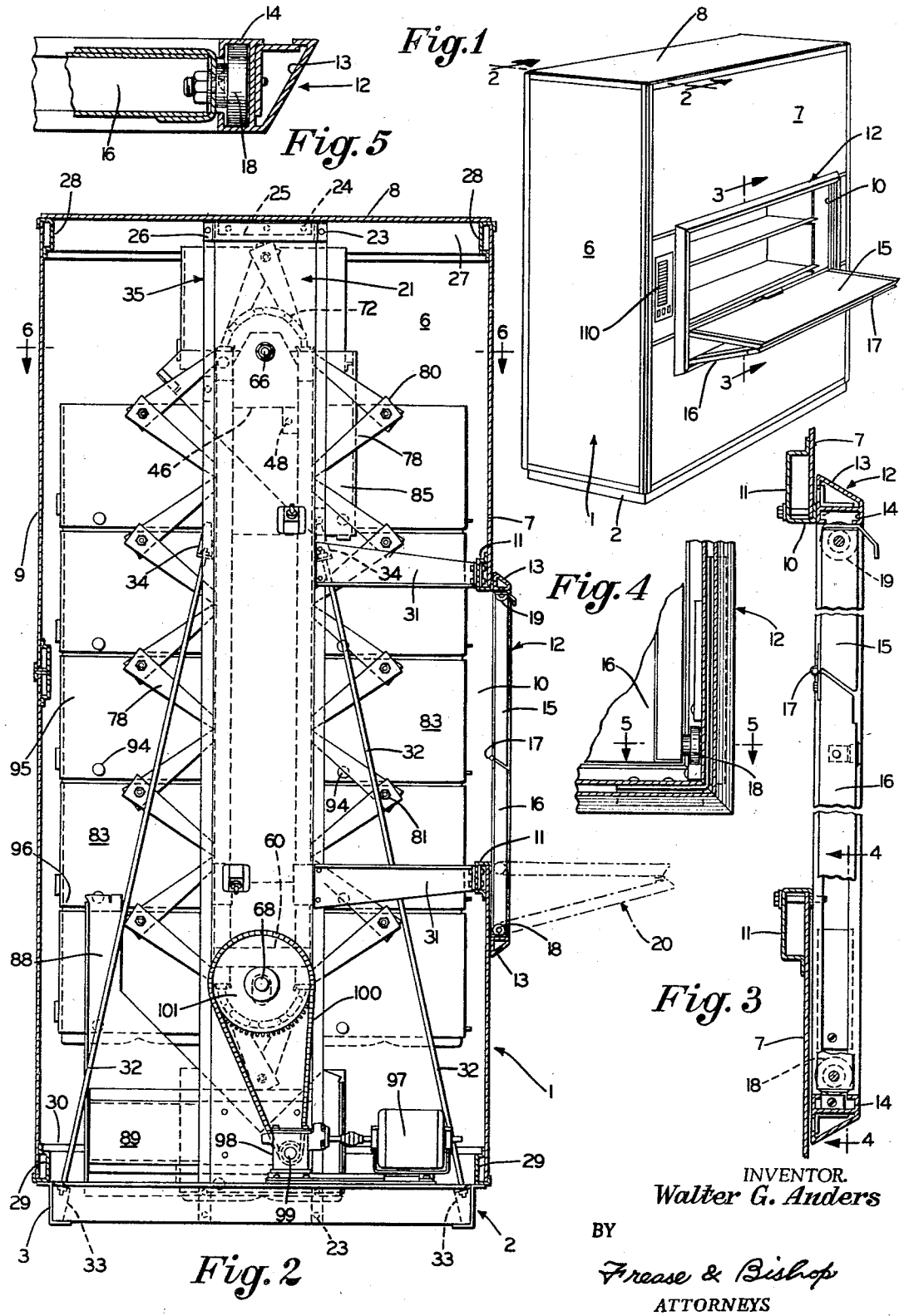
INVENTOR.
Walter G. Anders
BY
Frease & Bishop
ATTORNEYS

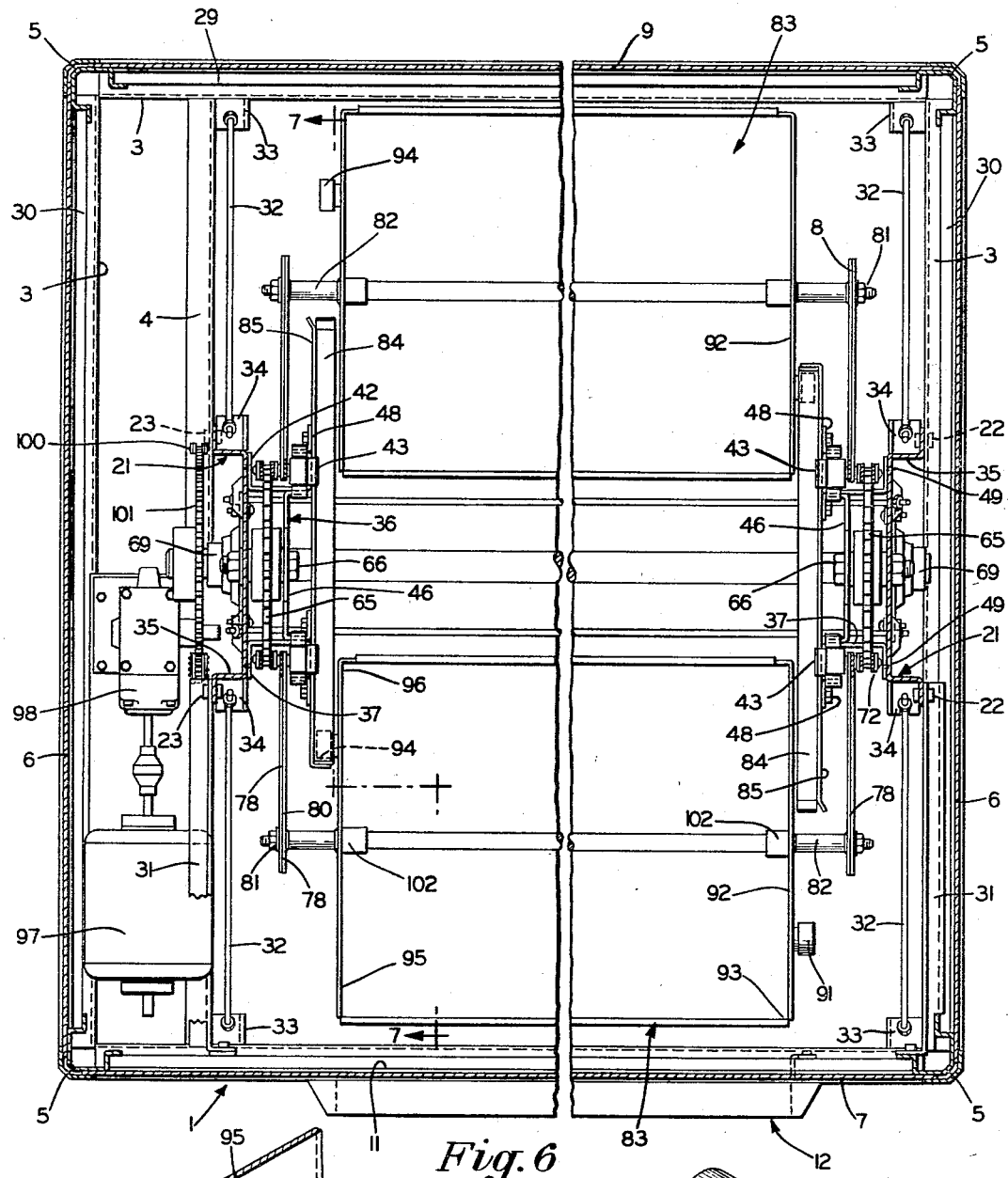
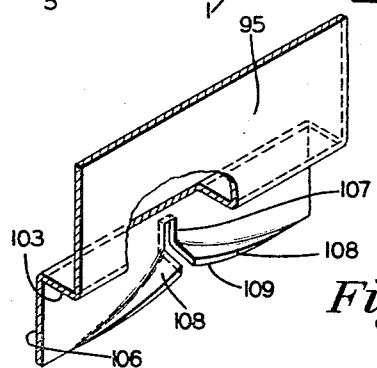
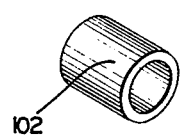
Fig. 6
Fig. 16
Fig. 17
INVENTOR.
Walter G. Anders
BY
Frease & Bishop
ATTORNEYS

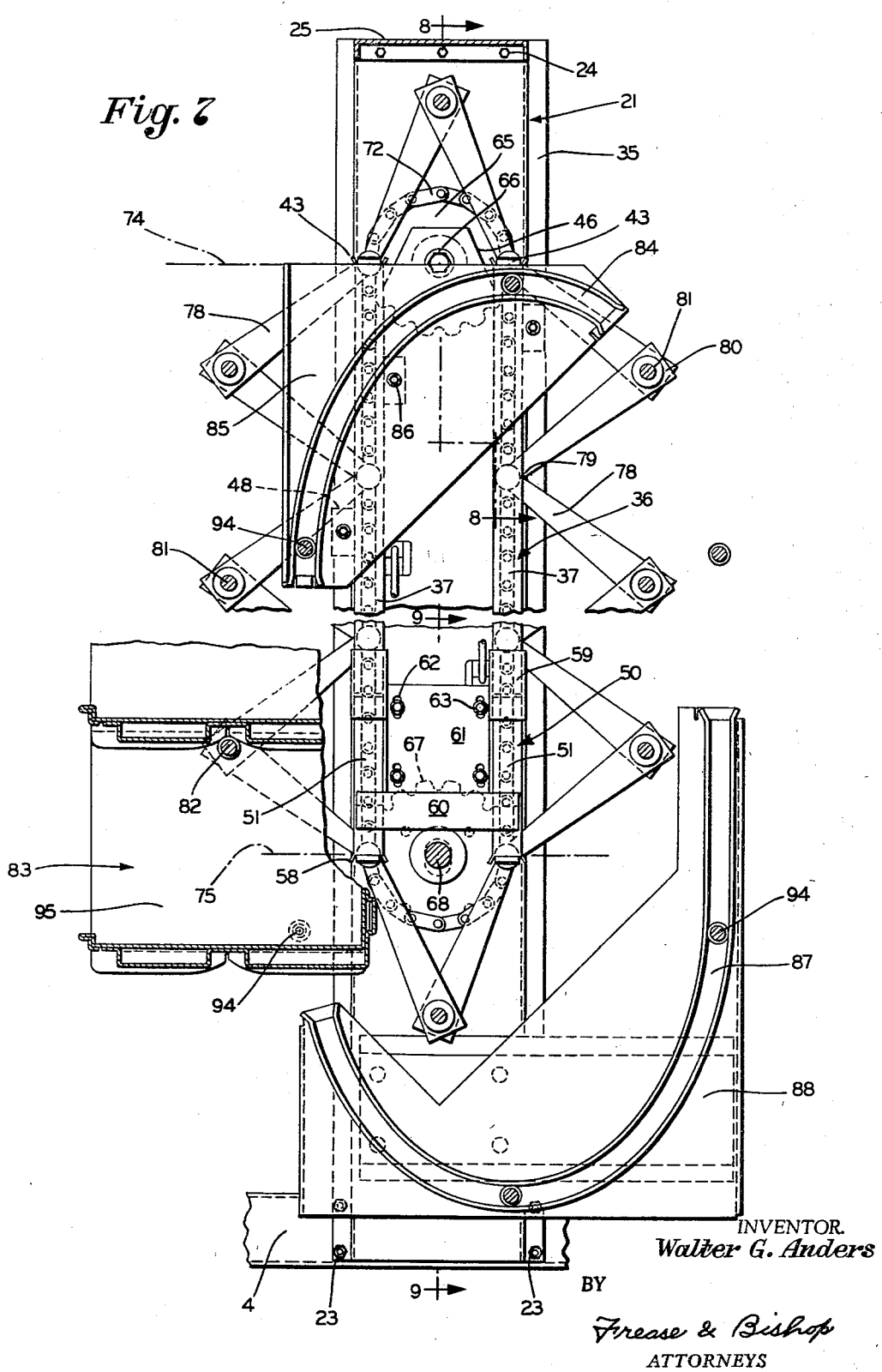

May 23, 1967 W. G. ANDERS 3,321,260
MECHANIZED POWER FILE CONSTRUCTION
Filed May 31, 1966 5 Sheets-Sheet 4
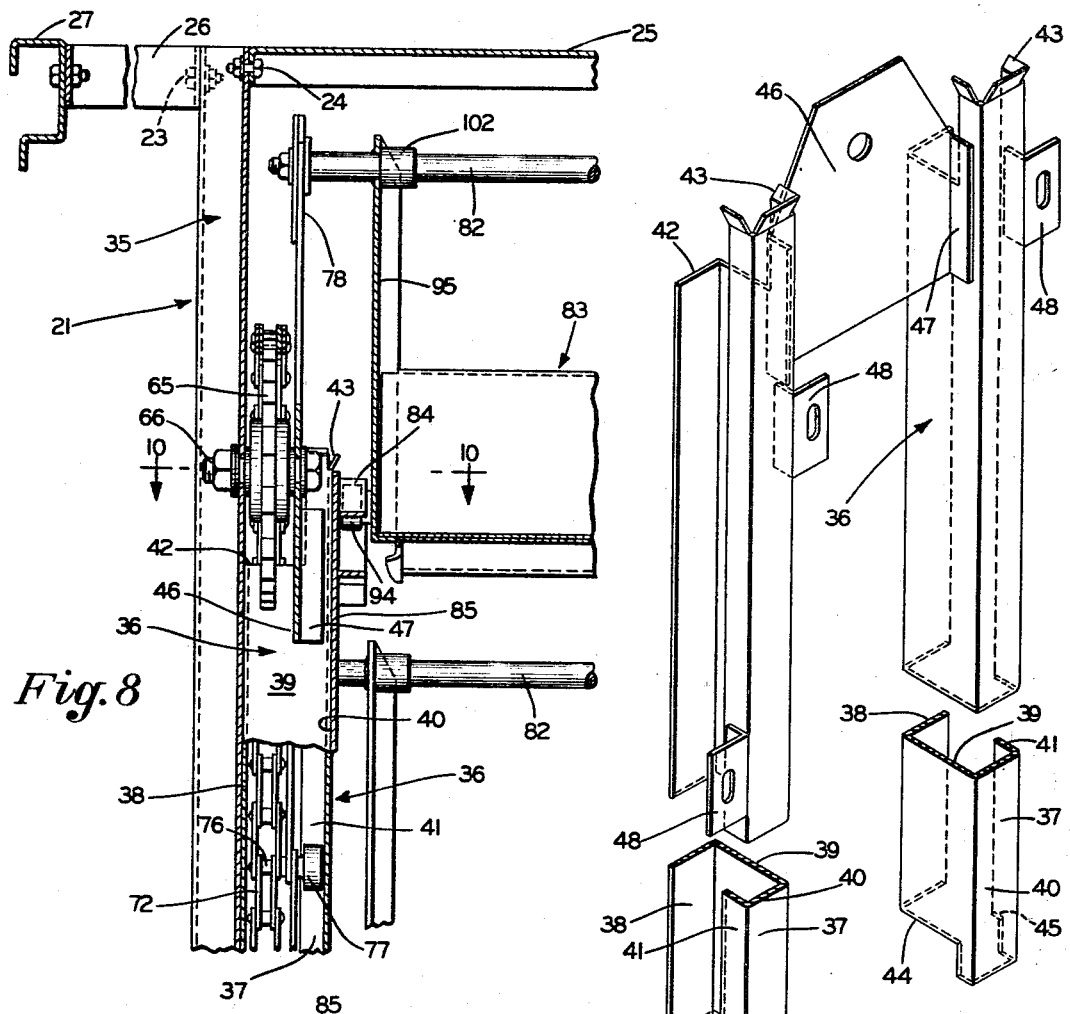
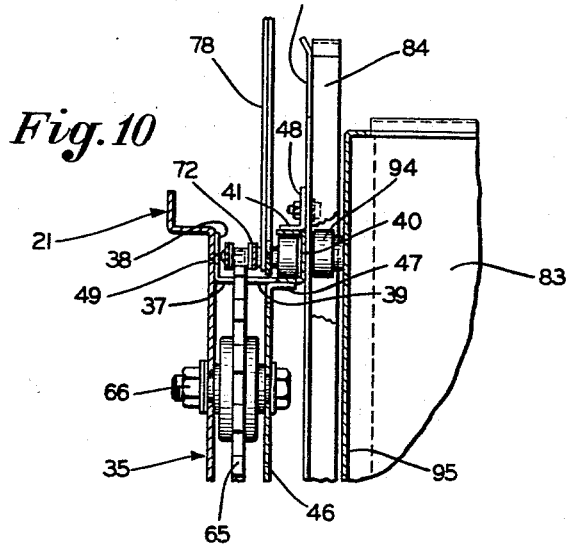
INVENTOR.
Walter G. Anders
BY
Frease & Bishop
ATTORNEYS May 23, 1967  W. G. ANDERS  3,321,260

MECHANIZED POWER FILE CONSTRUCTION

Filed May 31, 1966  5 Sheets-Sheet 5

INVENTOR.
Walter G. Anders
BY
Frease & Bishop
ATTORNEYS

United States Patent Office 3,321,260
Patented May 23, 1967

3,321,260
MECHANIZED POWER FILE CONSTRUCTION
Walter G. Anders, Canton, Ohio, assignor to Diebold, Incorporated, Canton, Ohio, a corporation of Ohio
Filed May 31, 1966, Ser. No. 553,818
7 Claims. (Cl. 312—268)

This application is a continuation in part of my copending application Ser. No. 375,599, filed June 16, 1964.

The invention relates to a mechanized, power-operated, filing appliance of a type in which a plurality of card-carrying pans are mounted on an endless conveyor for movement in either direction in a continuous orbit of travel so that any selected pan may be moved rapidly and delivered by power means to a work station; and in which the file structure may extend substantially from the floor to the ceiling of a room in which it is located to provide a high ratio of filing space to occupied floor area.

More particularly, the invention relates to an extremely simplified mechanized power file consturction which may be shipped in knocked-down condition for ready assembly at the location of use; in which simplified vertical support and drive assemblies are provided for supporting and driving the pans, eliminating special sprockets, housings, support members and bearing mounts previously required; in which a requirement of special right and left-hand support members is eliminated; in which drive chains and pan mounting arms are securely held in required positions at all times without relative lateral movement of the chain pivot points; in which an extremely simplified stabilizing construction is provided for the chain drive and pans suspended and moved by the chain drive; in which complicated mechanisms are avoided heretofore required for stabilizing power files of the general type to which the invention relates; in which a simplified work table and closure mechanism is provided for the file cabinet; and in which a simplified pan construction and drive mechanism is used.

Prior mechanized power files have involved complicated and expensive drive, pan-support and pan-stabilizing mechanisms. These not only have added substantially to the cost and maintenance of the file but also have occupied space which thus is unusable as filing space.

Accordingly, it is a primary object of the invention to provide a new mechanized power file construction composed of a number of sub-assemblies which may be assembled readily at the location of file use, and which sub-assemblies have simplified constructions and substantially lower costs than similar components of mechanized file constructions known in the prior art.

Furthermore, it is an object of the present invention to provide a new mechanized power file construction having a simplified support unit at either end of the file containing the chain drive, pan-mounting and pan-stabilizing mechanisms on which pans are mounted, driven and stabilized for movement in the desired orbit of pan travel.

Also, it is an object of the invention to provide a power file construction having a cabinet provided with an access opening at a work station and a foldable door construction movable to one position to provide a closure for the access opening and movable to another position exposing the access opening and forming a work table at the work station.

Finally, it is an object of the invention to provide a new mechanized power file construction in which the various new mechanisms and sub-assemblies are incorporated to provide for the erection of a low cost file at a place of use from the various elements and mechanisms which may be shipped in knocked-down condition; thereby eliminating difficulties heretofore encountered in the art, achieving the stated objects and solving problems and satisfying needs existing in the art.

These and other objects and advantages apparent from the following description may be obtained, the stated results achieved and the described difficulties overcome by the apparatus, combinations, parts, elements, subcombinations, mechanisms, arrangements and constructions which comprise the present invention, the nature of which is set forth in the following general statement, a preferred embodiment of which—illustrative of the best mode in which applicant has contemplated applying the principles—is set forth in the following description and shown in the drawings, and which are particularly and distinctly pointed out and set forth in the appended claims forming part thereof.

The nature of the improved construction may be stated in general terms as including in a power file of the type in which a plurality of pans are mounted on an endless conveyor carried by support means for movement in either direction in a continuous orbit of travel and any selected pan is delivered by power means to a work station location; a base, support units mounted on and extending upward from the base at either end of the base, each support unit comprising a column member, an upper track assembly mounted on the column member, and a lower track assembly adjustably mounted on the column member; the track assemblies each including spaced channel track members each forming a chain-receiving channel portion and a roller-receiving channel portion; means including offset complementary notches formed in the lower ends of the upper track members and in the upper ends of the lower track members adjustably connecting the upper and lower track members; an upper drive sprocket mounted on the support unit between the column and upper track assembly; means mounting a lower drive sprocket on the column adjacent the lower end of the adjustable lower track assembly; the upper and lower ends of the upper and lower track members terminating respectively in spaced upper and lower horizontal planes passing respectively through the axes of the upper and lower sprockets; the centre lines of the track roller-receiving channel portions being tangent to the pitch lines of said upper and lower sprockets; an endless drive chain having pivotally connected links trained around said upper and lower sprockets and having vertical flights located and movable along the chain-receiving channel portions of said upper and lower track members; pivot pins extending at intervals from link connections of said drive chains, rollers located inboard of said chains and mounted on said pivot pins for movement along said rolller-receiving channel portions of said upper and lower track members; a series of pans, scissors arms having their inner ends pivotally mounted on said roller pivot pins and adapted to support at their outer ends said series of pans; stabilizing track segments mounted on said upper and lower track assemblies inboard of said track channels, the pans having end walls, stabilizing rollers mounted on the pan end walls engageable and traveling in said stabilizing tracks during rotary pan movement around said upper and lower sprocket shafts; said pans including hanger shafts supporting the pan end walls, the outer ends of said hanger shafts being pivotally supported on the outer ends of said support arms, the pan end walls being formed at the pan bottom with an inturned and a downturned flange having a pair of outturned ears provided with curved angular surfaces; a resilient rubber sleeve mounted on each hanger shaft adjacent each pan end wall; said ears on said pans engaging and resiliently compressing the sleeves on the hanger shaft on the pan next below during pan movement along the track members in the orbit of travel; a main drive shaft extending between and connected to the lower sprockets of the units at either end of the base; means for driving said drive shaft in either direction to drive said endless drive chains; means for adjusting the lower drive sprockets relative to the upper drive sprockets to tension said drive chains; said adjustable lower track assemblies being adjustable relative to the upper track assemblies in accordance with said sprocket adjustment; cabinet means enclosing the pans, support units and drive means having a front wall formed with an access opening; and collapsible door means for said access opening movable to one position closing said opening and movable to an open collapsed position forming a shelf adjacent said access opening.

By way of example, an embodiment of the improved mechanized power file construction is shown in the accompanying drawings forming part hereof in which FIGURE 1 is a perspective view of a mechanized power file constructed from the improved mechanisms;

FIG. 2 is an enlarged vertical sectional view taken on the line 2—2, FIG. 1;

FIG. 3 is a further enlarged fragmentary sectional view taken on the line 3—3, FIG. 1 with the closure for the access opening shown in closed position;

FIG. 4 is a fragmentary sectional view looking in the direction of the arrows 4—4, FIG. 3;

FIG. 5 is another fragmentary sectional view taken on the line 5—5, FIG. 4;

FIG. 6 is a plan sectional view taken on the line 6—6, FIG. 2;

FIG. 7 is an enlarged vertical sectional view with parts broken away looking in the direction of the arrows 7—7, FIG. 6;

FIG. 8 is an enlarged sectional view taken on the line 8—8, FIG. 7;

FIG. 10 is a fragmentary sectional view taken on the line 10—10, FIG. 8;

FIG. 11 is a perspective view of the upper trapping-track device used in the improved construction;

FIG. 16 is a perspective view of a stabilizing formation formed on one of the pans; and FIG. 17 is a perspective view of a resilient sleeve which also forms part of the improved pan stabilizing mechanism.

Similar numerals refer to similar parts throughout the various figures of the drawings.

Figure 9:
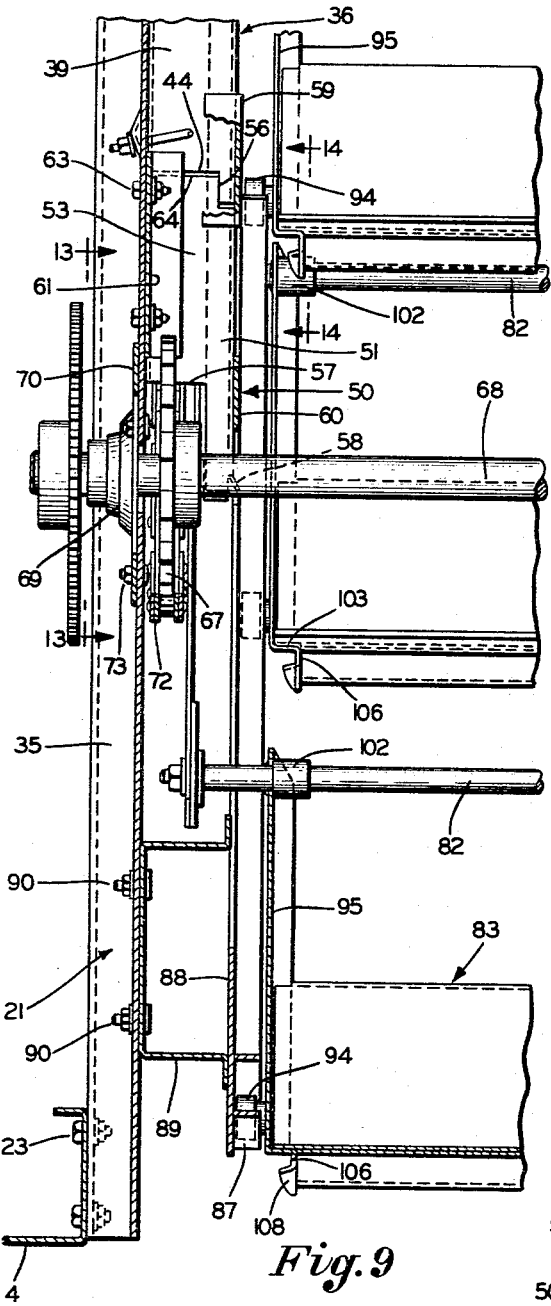
FIG. 9 is a similar view taken on the line 9—9, FIG. 7.
Figure 13:
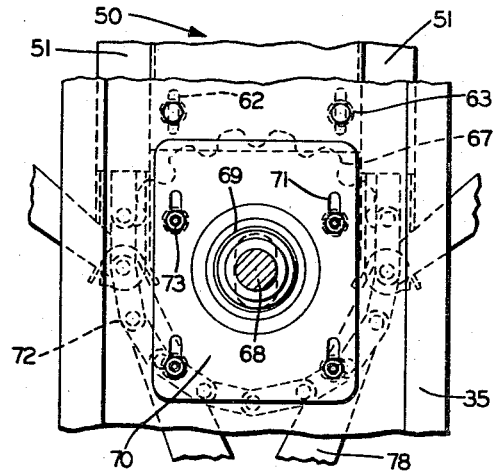
FIG. 13 is a fragmentary sectional view taken on the line 13—13, FIG. 9.

The improved mechanized power file is indicated generally at 1 and is mounted on a base 2 formed of preferably Z-shaped side and end members 3 connected at the four corners to form a rectangular base frame. An additional channel-shaped brace member 4 (FIGS. 6 and 9) extends between front and back base frame members 3 spaced from the frame member 3 at the left end of base 2.

Vertical corner posts 5 extend upward from the corners of the base 2. Cabinet panel end walls 6, front wall 7, top wall 8, and rear wall 9 are mounted in any suitable manner on base 2 and corner posts 5 to enclose the filing mechanism.

Cabinet front wall 7 preferably is formed with a rectangular access opening 10 which may be closed by any suitable closure or door. Cabinet frame reinforcing channels 11 preferably are connected to the interior of front cabinet wall 7 along the top and bottom edges of access opening 10. Access opening 10 also is provided on the outside front wall 7 with a rectangular frame generally indicated at 12 and preferably formed by frame members which in cross section have a triangular portion 13 and a channel portion 14, with the channel portions 14 opening inwardly around the four sides of the rectangular access opening frame 12.

The closure for access opening 10 preferably comprises a folding door having an upper door member 15 and a lower door member 16 pivotally connected by hinge 17. Rollers 18 are mounted to extend laterally from the lower corners of lower door member 16, and rollers 19 are mounted to extend laterally from the upper corners of the upper door member 15. Rollers 18 and 19 ride in the vertical channel portions 14 of frame 12. Hinge 17 between upper and lower door members 15 and 16 moves outward of the cabinet when the door members are folded from closed position of FIG. 3 to open position of FIG. 1 also designated at 20 in dot-dash lines in FIG. 2. The closure or door members 15–16 in folded or open position 20, as shown in full lines in FIG. 1, form a table adjacent access opening 10 at the file work station.

In accordance with the invention an upright support unit assembly generally indicated at 21 is mounted on each end of the base 2 within the cabinet walls. Support units 21 are identical and do not require right and left-hand arrangements. Unit 21 at the right of FIG. 6 is bolted at its lower end to one of the base end members 3 by bolts 22. Unit 21 at the left of FIG. 6 is bolted at 23 to brace member 4 adjacent the left end of base 2. Both support units 21 are bolted at 24 at their upper ends to the ends of channel stretcher member 25. Member 25 in addition to tying the units 21 together, forms a support for cabinet top 8 (FIGS. 2, 7 and 8). The upper end of left support unit 21 (FIGS. 6 and 8) is connected by upper tie angle 26 with one of the cabinet frame top end members 27 extending between the upper ends of corner posts 5. The cabinet frame also has top, front, and back members 28 completing the cabinet upper frame structure. Similar members 29 and 30 at the lower end of the cabinet connected to corner posts 5 complete the cabinet frame structure for panel walls 6, 7, 8 and 9.

Tie angle struts 31 are connected to each support unit 21 and to each reinforcing channel 11 above and below and at either end of access opening 10 (FIGS. 2 and 6). A series of tie rods 32 are connected at their lower ends to ears 33 mounted on base 2 adjacent each corner and at their upper ends to ears 34 mounted on upper front and rear portions of units 21 to form a stable structure for the mechanisms housed within the cabinet.

Each support unit 21 includes an upright channel column member 35 which, as described, is bolted at its lower end by bolts 22 or 23 to the base 2 and at its upper end by bolts 24 to stretcher 25. An upper trapping-track assembly generally indicated at 36 (FIG. 11) is mounted on each column 35. Track unit 36 includes two upright track members 37, each of which is formed in cross section with a mounting flange 38, a web 39, a channel flange 40 and an inturned flange 41. The upper ends of flange 38 and web 39 are notched downwardly at 42. The remainder of web 39 and flanges 40 and 41 are flared outwardly at 43 at their upper ends.

The lower ends of flange 38 and web 39 are notched upwardly at 44, and the lower end of flange 41 is similarly notched at 45. Bearing plate 46 has flanges 47 secured preferably by spot-welding to the upper ends of web members 39 of track members 37. A number of angle brackets 48 with slotted openings are spot-welded to track members 37, two on the left-hand track member and one on the right-hand track member (FIG. 11). The upper trapping-track assembly 36 shown in FIG. 11 is mounted on column 35 by spot-welding the mounting flanges 38 to column 35 as indicated at 49, particularly in FIG. 10.

Figure 12:
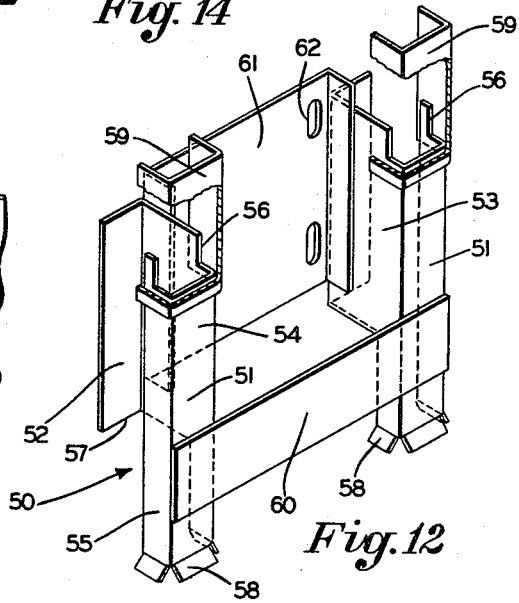
FIG. 12 is a similar perspective view of the lower adjustable trapping-track.

The track system also includes a lower adjustable trapping-track assembly generally indicated at 50 (FIG. 12). Track assembly 50 includes track members 51 each formed with a cross section similar to that of track members 37, with a mounting flange 52, a web 53, a channel flange 54 and an inturned flange 55. The upper ends of track members 52, 53, 54 and 55 are notched at 56 with a formation complementary to the notching 44 and 45 at the lower ends of track members 37.

The lower ends of track members 51 are notched upwardly at 57 and portions thereof are flared outwardly at 58 similar to the notching and flaring 42 and 43 at the upper ends of track members 37. Channel cover brackets 59 are mounted on track members 51 and enclose and extend above the notched ends 56 of lower track members 51. Brackets 59 also slidably enclose (FIGS. 7 and 9) the lower ends of track members 37.

Track members 51 are connected together to form a unitary assembly (FIG. 12) by strap 60 and channel mounting plate which is slotted at 62.

The lower trapping-track assembly 50 is mounted (FIG. 9) on a lower portion of column 35 by bolts 63 engaged in the slots 62 of mounting plate 61 so that track assembly 50 may be adjusted vertically of column 35 relative to upper trapping-track 36. When thus assembled, the notched end 56 of lower track members 51 interengage the notched ends 44–45 of upper track members 37 (FIG. 9) so that web portions 39 and 53 present continuous track surfaces without a break where rollers contact the track, notwithstanding the gap-space 64 which is present and may change in size as a result of relative adjustment of track assemblies 36 and 50.

A top drive sprocket 65 is mounted on a bolt stub shaft 66 near the top of each support unit assembly 21. Bolt shaft 66 extends between bearing plate 46 of upper track assembly 36 and column 35. A small compartment (FIG. 10) thus is formed by members 46, 35, and the web 39 of track members 37 in which the upper sprocket 65 is located.

Similarly, a lower drive sprocket 67 is mounted on the ends of main drive shaft 68 adjacent the lower end of lower track assembly 50 (FIG. 9). Drive shaft 68 is mounted in bearings 69 carried by mounting plates 70, slotted at 71 for adjustably mounting plates 70 on columns 35.

An endless drive chain 72 is trained around sprockets 65 and 67 in each support unit 21 and slack in drive chain 72 is taken up by adjustment of bolts 73 in slots 71 of bearing mounting plate 70. Location of the adjustment of chain slack take-up at lower end of support unit 21 enables the weight of the load to stretch and maintain the chains 72 stretched by gravity and the adjustment merely takes up slack.

In accordance with the invention, the locations where the upper track member flared ends 43 begin, are in a horizontal plane indicated in dot-dash lines at 74 in FIG. 7 which passes through the axis of bolt shaft 66; and the vertical center line of channel flange 40 of each track member 37 is tangent to the pitch line of upper sprocket 65.

Lower track assembly 50 is adjusted whenever shaft 68 is adjusted to take up slack in drive chains 72. When track members 51 are adjusted, the locations where the flared ends 58 begin lie in a horizontal plane indicated by dot-dash line 75 passing through the axis of drive shaft 68. The vertical center lines of channel flanges 54 also are tangent to the pitch diameter of lower sprocket 67.

The vertical flights of drive chain 72 (FIGS. 7, 8, and 10) are located in and move along the channel formed by flange 38 and web 39 of upper track members 37 and by flange 52 and web 53 of lower track members 51. Pivot pins 76 between the links of drive chain 72 at desired intervals extend inboard of the chain and journal rollers 77 at the inboard ends of pins 76. Rollers 77 are trapped in and travel in the channels formed by web 39 and flanges 40 and 41 of upper track members 37 and by web 53 and flanges 54 and 55 of lower track members 51. This trapping of the inboard-mounted rollers 77 in the tracks which extend vertically between planes 74 and 75 passing through the center lines of shafts 66 and 68 absolutely controls chain movement and requires the drive chain 72 and the pivot pins 76 thereon to move vertically without side sway even if some back-lash occurs in chain 72 due to stretching before an adjustment is made to compensate for chain stretch or due to uneven loading of the file.

A series of scissors-like mounting arms 78 are carried by drive chains 72 by pivotally mounting the inner ends 79 of a pair of adjacent arms 78 on each pivot pin 76. The outer ends 80 of arms 78 pivotally mount and support at 81 the ends of hanger shafts 82 of file pans 83 which thus hang from the hanger shafts 82.

Since rollers 77, pivot pins 76, and scissors arms 78 must travel vertically during chain movement, pans 83 hanging from hanger shafts 82 mounted and supported on the outer ends 80 of scissors arms 78 likewise must travel in a vertical direction without any lateral movement incident to chain drive side slap even if the latter occurs. Whenever any roller 77 enters or leaves vertical travel in tracks 37 or 51 moving either upward or downward, its movement is immediately controlled by the sprocket 65 or 67 around which the chain and therefore any roller 77 moves in the orbit of travel. This condition, and absolute control by trapping of rollers 77 either in the tracks or by the sprockets without interruption, results by locating the track ends at the planes 74 and 75 as described.

The transition between vertical and rotary movement occurs without any loss of control of forces which heretofore have imparted side sway to pans hanging from hangers supported outboard on a chain drive because of a gap in prior devices of control in the transition zone.

One important aspect of the invention is the ability, through the inboard mounting of rollers 77 trapped in the vertical tracks between the horizontal planes 74 and 75, to avoid any side sway of pans 83 at the transition between rectilinear and rotary movement in the orbit of travel of the pans supported and moved by the chain drive. Also, the inboard mounting of rollers 77 permits standard sprockets to be used. Heretofore, rollers mounted on chains in the line of chain travel and trapped in tracks have required special sprockets to accommodate the rollers.

Each support unit 21 also is provided with an upper stabilizing track 84 mounted on a plate 85 which in turn is bolted at 86 to the angle brackets 48 on upper track assembly 36. Similarly, a lower stabilizing track 87 mounted on a plate 88 is carried by bracket 89 (FIG. 9) bolted to column 35 at 90. Each pan 83 (FIG. 6) is provided with a stabilizing roller 91 projecting outwardly from one pan end wall 92 adjacent the lower front pan corner 93 and is provided with a similar roller 94 projecting from the other pan end wall 95 adjacent the lower rear corner 96 of the pan. Rollers 94 are engaged in, travel in and are controlled and guided by tracks 84 and 87 on the left-hand support unit 21 viewing FIG. 6 while rollers 91 on each pan similarly are engaged in and controlled by tracks 84 and 87 on the right-hand support unit 21.

Thus, pan movement is stabilized and controlled as the pans travel around the upper and lower rotary portions of the orbit of travel by the stabilizing tracks 84–87 and pan rollers 91–94.

Power for driving the file may be supplied by a motor 97 driving through a gear reduction 98 to drive sprocket 99 which drives the drive chain 100 which in turn drives sprocket 101 mounted on the outer end of main drive shaft 68 (FIGS. 2 and 6). Location of the drive shaft 68 at the bottom of the file, provides a very simple drive system for the drive chains in the two support units 21.

Figure 14:
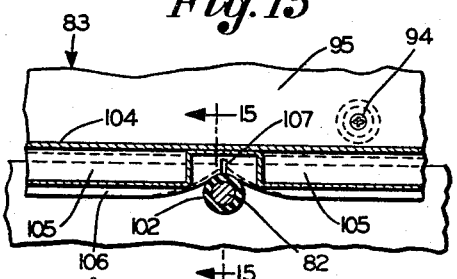
FIG. 14 is a view looking in the direction of the arrows 14—14, FIG. 9.

Another aspect of the manner in which the file is further stabilized involves an interconnection between the pans 83 during movement in the straight runs or flights of the orbital movement. During such movement, pans 83 are located one above another as shown in FIG. 2 and they travel in a stack and are locked together. This locking is accomplished as best shown in FIGS. 14, 15, 16 and 17 by placing a rubber sleeve 102 on each pan hanger shaft 82 preferably immediately adjacent the inside face of each pan end wall 95 or 92. The end wall 95 or 92 of each pan is preferably formed with an inturned flange 103 at its bottom edge which supports the floor or base plate 104 of the pan and which may be reinforced by box-like channel members 105 extending between the pan ends (FIG. 14).

Figure 15:
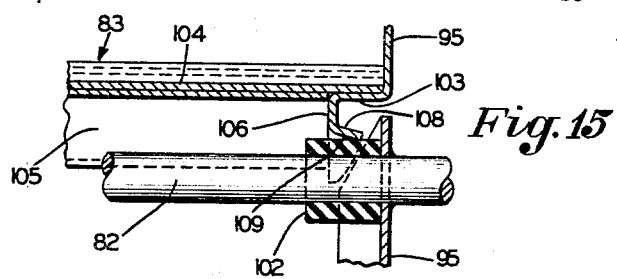
FIG. 15 is a fragmentary sectional view taken on the line 15—15, FIG. 14.

The inturned flange 103 preferably terminates in a downturned flange 106 for stiffening the pan and flange 106 is formed with a slit 107 centrally between the front and rear pan edges and immediately above the axis of the hanger shaft 82 of the pan next below (FIG. 14). Flange 106 is formed with a pair of outwardly extending ears 108 at either side of slit 107. Ears 108 are formed with a curved slanting undersurface 109 as best shown in FIG. 15. Flange 106 on any pan (FIGS. 7, 14, 15) extends downwardly inside the end wall 95 of the pan 83 next below and its ears 108 wedge-engage and compress the rubber sleeve 102 on the hanger shaft 82 of the pan 83 next below during vertical movement of the pans in block.

The resilient rubber sleeves 102 permit such compression but may be rotated and adjusted from time to time on shafts 82 so that the rubber does not take a permanent set from such compression which would reduce the efficiency of locking engagement between pans. Furthermore, the curved angular undersurfaces 109 of ears 108 provide a substantial area of interengagement and compression of the sleeves 102 by the ears 108.

The interlocking stabilizing arrangement just described provides a most efficient but inexpensive structure for interlocking the pans during their movement in the vertical flights of their orbit of travel.

File 1 may be operated in any desired manner by control buttons at the control panel 110 connected with the control system for motor operation to bring any desired pan 83 to an accessible position at the access opening 10 adjacent the work station.

In accordance with the invention, various components of the file including the file pans 83, the base 2, the cabinet walls, the support unit assemblies 21, the main drive shaft 68, etc. may be shipped in knocked-down condition to a place of use where the file may be erected. Otherwise, since the file may extend from floor to ceiling in a room, it might be impossible to locate the file in the desired room if shipped in assembled condition, because of it being bigger than any doors or other means of access to the room.

In erecting the file, the base 2 is leveled, the support unit assemblies 21 are mounted thereon and the various cabinet frame members assembled including the struts 31, tie rods, etc. Drive shaft 68 may be connected with the lower sprockets 67 of each support unit. The motor drive, etc. may be connected with the drive shaft 68. The various cabinet walls may be mounted on the cabinet frame elements after the pans have been hung through their hanger shafts 82 on pairs of scissors arms 78 which are carried by the chains in the support unit assemblies 21.

The essential or fundamental drive, support, and stabilizing mechanisms all are carried either on the support unit assemblies 21 or the pans, and the various drive and stabilizing devices cooperate to provide silent stabilized movement of the pans in the orbit of travel.

Moreover, the support units 21 at the two ends of the file are duplicate units eliminating any requirement for right- and left-hand constructions and, similarly, any requirement for right- and left-hand repair parts for such devices.

The structural arrangement of the column 35, track assemblies 36 and 50 mounted thereon, the bolt shafts 66 and sprockets 65 thereon, and the tracks and rolltrapping channels formed by track assemblies 36 and 50 provide in the support units 21 not only the main vertical file support members but the housings and mounts for the drive mechanisms without special added housings, support members and bearings heretofore required in prior art files.

The movable track assembly location at the bottom of the file as well as the location of the drive shaft adjustment at the bottom of the file permits the drive chains to be tensioned at all times and at the same time permits the pan mounting arms to be held rigidly in the required positions at all times without relative lateral movement of the chain pivot points achieved by trapping the inboard mounted rollers in the track members.

The stabilizing rollers 91–94 and tracks 84–87 are very simple in construction. They are located inboard of the drive chains. The stabilizing tracks 84–87 are mounted on the support units and on the track assemblies 36 and 50 so that when the lower track unit 50 is adjusted for tensioning the chains, the stabilizing tracks also are similarly adjusted to maintain the required relationship. This arrangement also permits the top stabilizing tracks 84 to be located inside the path of orbital movement or below bolt shaft 66, and the lower stabilizing tracks 87 to be located outside the path of orbital movement or below main shaft 68; all of which avoids complicated mechanisms that heretofore have been required for stabilizing prior art files.

Accordingly, the invention provides an extremely efficient mechanized power file of simplified construction which may be shipped in knocked-down condition and readily erected or repaired with a minimum of expense and difficulty and, thus, provides a new construction combining the concepts described and accomplishing the many new functions and achieving the new results indicated, thereby solving existing problems in the art.

In the foregoing description, certain terms have been used for brevity, clearness and understanding, but no unnecessary limitations are to be implied therefrom beyond the requirements of the prior art because such terms are used for descriptive purposes and are intended to be broadly construed.

Moreover, the description and illustration of the invention is by way of example and the scope of the invention is not limited to the exact structures shown, because the various parts, components and mechanisms may be varied to provide other structural embodiments without departing from the fundamental concepts, aspects and principles of the invention.

Having now described the features, discoveries and principles of the invention, the construction, assembly, characteristics, operation and use of a preferred form thereof, and the advantageous, new and useful results obtained thereby; the new and useful discoveries, principles, apparatus, combinations, parts, elements, subcombinations, structures, mechanisms and cooperative relationships and arrangements, and mechanical equivalents obvious to those skilled in the art are set forth in the appended claims.

I claim:

1. In mechanized power file construction of the type in which a plurality of pans are mounted on an endless conveyor carried by support means for movement in either direction in a continuous orbit of travel and any selected pan is delivered by power means to a work station location; a base, a support unit mounted on and extending upward from each end of the base; each support unit comprising a column member, an upper track assembly mounted on the column member, and a lower track assembly adjustably mounted on the column member; the track assemblies each including spaced upwardly extending channel track members each forming a chain-receiving channel portion and an adjacent roller-receiving channel portion, means adjustably connecting the lower ends of the upper track members and the upper ends of the lower track members together; an upper drive sprocket, means mounting the upper drive sprocket on and between the support unit column and upper track assembly; a lower drive sprocket, means mounting the lower drive sprocket on the column adjacent the lower end of the lower track assembly; the upper and lower ends of the upper and lower track members terminating respectively at spaced upper and lower horizontal planes passing respectively through the axes of the upper and lower sprockets; the center lines of the track member roller-receiving channel portions being tangent to the pitch lines of said upper and lower sprockets; an endless drive chain having pivotally connected links trained around said upper and lower sprockets and having vertical flights located and movable along the track member chain-receiving channel portions; pivot pins extending at intervals from drive chain link connections into said track member roller-receiving channel portions, rollers located inboard of said chains mounted on said pivot pins movable along and trapped in said track member roller-receiving channel portions; a series of pans, scissors arms having their inner ends pivotally mounted on said roller pivot pins; each pan having end walls and a hanger shaft extending through said end walls, the ends of said hanger shafts outside said end walls being pivotally mounted and supported on the outer ends of said scissors arms; stabilizing track segments mounted on said upper and lower track assemblies inboard of said channel track members, stabilizing rollers mounted on the pan end walls engageable and traveling in said stabilizing tracks during rotary pan movement around said upper and lower sprockets; means including compressible members on the hanger shaft of one pan adjacent the pan end walls and ear means extending from the end walls of the pan next above interengageable between such pans to interlock the pans against relative lateral movement during pan movement along the track members in the orbit of travel; a drive shaft connecting the lower sprocket members of the support units at each end of the base, means driving said drive shaft in either direction to drive said endless drive chains; means for adjusting the lower drive sprockets relative to the upper drive sprockets to tension said drive chains, and said adjustable lower track assemblies being adjustable relative to the upper track assemblies in accordance with said sprocket adjustment.

2. The construction defined in claim 1 in which the support units at each end of the base have a similar construction; in which the stabilizing track segments on the two support units face each other, and the track segments on one support unit are offset forwardly of the base and the track segments on the other support unit are offset rearwardly of the base; in which the stabilizing roller on one pan end wall of each pan is offset forwardly of the pan hanger shaft for engagement and travel in the forwardly offset stabilizing track segments; and in which the stabilizing roller on the other end wall of each pan is offset rearwardly of the pan hanger shaft for engagement and travel in the rearwardly offset stabilizing track segments.

3. The construction defined in claim 1 in which the means adjustably connecting together the lower ends of the upper track members and the upper ends of the lower track members includes offset complementary notches formed in the lower ends of the upper track members and in the upper ends of the lower track members slidably engaged with one another to present continuous track surfaces for engagement with the inboard pivot pin rollers traveling in the track member roller-receiving channel portions.

4. The construction defined in claim 3 in which cover brackets enclose the adjacent slidably engaged notched ends of the upper and lower track members.

5. The construction defined in claim 1 in which each upper and lower channel track member is formed in cross section with a mounting flange, a web, a channel flange and an inturned flange forming the chain-receiving channel portion between the mounting flange and the web, and forming the adjacent roller-receiving channel portion between the web, channel flange and inturned flange; and in which the free edge of the inturned flange is spaced from the mounting flange to provide a slot through which the inner ends of the scissors arms extend for connection with the pivot pins between the chain links and rollers.

6. The construction defined in claim 1 in which the means interengageable between the pans to interlock pans against lateral movement during pan movement along the track members includes a resilient rubber sleeve mounted on each hanger shaft adjacent each pan end wall, and includes the pan end walls formed at the pan bottom with an inturned and then downturned flange having a pair of outturned ears provided with curved angular surfaces engageable and resiliently compressing the sleeves on the hanger shaft of the pan next below.

7. The construction defined in claim 1 in which the base, support units, pans and drive means are enclosed with front, side, rear, and top cabinet walls structurally connected to the base and support units; in which the cabinet front wall is provided with an access opening; and in which the access opening is closed by a foldable door closure formed as a shelf when in open folded position.

References Cited by the Examiner
UNITED STATES PATENTS 3,199,658   8/1965   Graber et al. _____ 198—158
3,236,577   2/1966   Anders et al. _____ 312—223

CHANCELLOR E. HARRIS, *Primary Examiner.*